(12) United States Patent
Lee et al.

(10) Patent No.: US 10,690,994 B2
(45) Date of Patent: Jun. 23, 2020

(54) STABLE DIFFERENCE FREQUENCY GENERATION USING FIBER LASERS

(71) Applicant: IMRA America, Inc., Ann Arbor, MI (US)

(72) Inventors: Kevin F. Lee, Ann Arbor, MI (US); Martin E. Fermann, Dexter, MI (US)

(73) Assignee: IMRA America, Inc., Ann Arbor, MI (US)

( * ) Notice: Subject to any disclaimer, the term of this patent is extended or adjusted under 35 U.S.C. 154(b) by 0 days.

(21) Appl. No.: 16/191,127

(22) Filed: Nov. 14, 2018

(65) Prior Publication Data

US 2019/0079368 A1 Mar. 14, 2019

Related U.S. Application Data

(63) Continuation of application No. PCT/US2017/033549, filed on May 19, 2017.
(Continued)

(51) Int. Cl.
*G02F 1/35* (2006.01)
*G02F 1/01* (2006.01)
(Continued)

(52) U.S. Cl.
CPC .......... *G02F 1/3534* (2013.01); *G02B 6/00* (2013.01); *G02F 1/0121* (2013.01);
(Continued)

(58) Field of Classification Search
None
See application file for complete search history.

(56) References Cited

U.S. PATENT DOCUMENTS

| 8,040,929 B2 | 10/2011 | Imeshev et al. |
| 8,120,778 B2 * | 2/2012 | Fermann ............... G01N 21/31 356/451 |

(Continued)

FOREIGN PATENT DOCUMENTS

| WO | WO 2016/001604 A1 | 1/2016 |
| WO | WO 2016/048740 A2 | 3/2016 |
| WO | WO 2017/209989 A1 | 12/2017 |

OTHER PUBLICATIONS

Fattahi et al., "Pump-seed synchronization for MHz repetition rate, high-power optical parametric chirped pulse amplification," Optics Express, vol. 20, pp. 9833-9840, Apr. 2012.
(Continued)

*Primary Examiner* — Rhonda S Peace
(74) *Attorney, Agent, or Firm* — Knobbe, Martens, Olson & Bear, LLP

(57) ABSTRACT

Systems and methods for stabilizing mid-infrared light generated by difference frequency mixing may include a mode locked Er fiber laser that generates pulses, which are split into a pump arm and a wavelength shifting, signal arm. Pump arm pulses are amplified in Er doped fiber. Shifting arm pulses are amplified in Er doped fiber and shifted to longer wavelengths in Raman-shifting fiber or highly nonlinear fiber, where they may be further amplified by Tm doped fiber, and then optionally further wavelength shifted. Pulses from the two arms can be combined in a nonlinear crystal such as orientation-patterned gallium phosphide, producing a mid-infrared difference frequency, as well as nonlinear combinations (e.g., sum frequency) having near infrared and visible wavelengths. Optical power stabilization can be achieved using two wavelength ranges with spectral filtering and multiple detectors acquiring informa-
(Continued)

tion for feedback control. Controlled fiber bending can be used to stabilize optical power.

27 Claims, 12 Drawing Sheets

Related U.S. Application Data

(60) Provisional application No. 62/344,783, filed on Jun. 2, 2016, provisional application No. 62/478,800, filed on Mar. 30, 2017.

(51) Int. Cl.
| | |
|---|---|
| G02F 1/355 | (2006.01) |
| G02F 1/365 | (2006.01) |
| H01S 3/067 | (2006.01) |
| H01S 3/16 | (2006.01) |
| H01S 3/00 | (2006.01) |
| G02B 6/00 | (2006.01) |
| H01S 3/23 | (2006.01) |
| H01S 3/13 | (2006.01) |
| H01S 3/11 | (2006.01) |
| H01S 3/30 | (2006.01) |

(52) U.S. Cl.
CPC .......... *G02F 1/0128* (2013.01); *G02F 1/3551* (2013.01); *G02F 1/365* (2013.01); *H01S 3/0092* (2013.01); *H01S 3/06758* (2013.01); *H01S 3/11* (2013.01); *H01S 3/1301* (2013.01); *H01S 3/1305* (2013.01); *H01S 3/1307* (2013.01); *H01S 3/1608* (2013.01); *H01S 3/1616* (2013.01); *H01S 3/2391* (2013.01); *H01S 3/302* (2013.01); *G02F 2001/3528* (2013.01); *H01S 3/0071* (2013.01); *H01S 3/1106* (2013.01); *H01S 3/161* (2013.01); *H01S 3/1611* (2013.01); *H01S 3/1618* (2013.01)

(56) References Cited

U.S. PATENT DOCUMENTS

| | | | |
|---|---|---|---|
| 8,498,046 B2* | 7/2013 | Dong | H01S 3/06716 359/341.5 |
| 8,811,435 B2 | 8/2014 | Hellerer | |
| 8,861,555 B2 | 10/2014 | Fermann et al. | |
| 9,036,971 B2 | 5/2015 | Hartl et al. | |
| 9,244,332 B1* | 1/2016 | Calendron | G02F 1/39 |
| 9,354,485 B2* | 5/2016 | Fermann | G02F 1/39 |
| 2002/0071453 A1* | 6/2002 | Lin | H01S 3/13 372/6 |
| 2014/0254618 A1 | 9/2014 | Shah et al. | |

OTHER PUBLICATIONS

Foltynowicz et al., "Cavity-enhanced optical frequency comb spectroscopy in the mid-infrared application to trace detection of hydrogen peroxide," Applied Physics B, vol. 110, pp. 163-175, Feb. 2013.
T.R. R Schibli et al., "Attosecond active synchronization of passively mode-locked lasers by balanced cross correlation," Optics Letters, Jun. 1, 2003, pp. 947-949.
Alexander Schwarz et al., "Active stabilization for optically synchronized optical parametric chirped pulse amplification," Optics Express, vol. 20, No. 5, Feb. 27, 2012.
Invitation to Pay Additional Search Fees in corresponding International Patent Application No. PCT/US2017/033549, dated Aug. 23, 2017, in 14 pages.
International Search Report and Written Opinion in corresponding International Patent Application No. PCT/US2017/033549, dated Oct. 19, 2017, in 18 pages.
Batysta, et al., "Pulse synchronization system for picosecond pulse-pumped OPCPA with femtosecond-level relative timing jitter", Optics Express, vol. 22, No. 24, pp. 30281-30286, Dec. 1, 2014.
Cruz, et al., "Mid-infrared optical frequency combs based on difference frequency generation for molecular spectroscopy", Optics Express, vol. 23, No. 20, pp. 26814-26824, Oct. 5, 2015.
Hädrich, et al., "Improving carrier-envelope phase stability in optical parametric chirped-pulse amplifiers by control of timing jitter", Optics Letters, vol. 37, No. 23, pp. 4910-4912, Optical Society of America, Dec. 1, 2012.
Rothhardt, et al., "Octave-spanning OPCPA system delivering CEP-stable few-cycle pulses and 22 W of average power at 1 MHz repetition rate", Optics Express, vol. 20, No. 10, pp. 10870-10878, Optical Society of America, May 7, 2012.

* cited by examiner

STABLE DIFFERENCE FREQUENCY GENERATION USING FIBER LASERS

CROSS-REFERENCE TO RELATED APPLICATIONS

This application is a continuation of PCT International Application No. PCT/US2017/033549, filed May 19, 2017, which claims the benefit of priority to U.S. Patent Application No. 62/344,783, filed Jun. 2, 2016 and to U.S. Patent Application No. 62/478,800, filed Mar. 30, 2017, all of which are entitled STABLE DIFFERENCE FREQUENCY GENERATION USING FIBER LASERS; all of the foregoing applications are hereby incorporated by reference herein in their entireties.

FIELD

The present disclosure relates generally to the construction of stable mid-infrared optical sources and their applications.

BACKGROUND

High brightness broadband mid-infrared sources have applications in spectroscopy, microscopy, sensing, and metrology. Such sources need to have stable optical output, and be physically robust for mass market applications. Fiber lasers provide robust, stable, and highly amplified pulsed light in the near infrared, which can be converted to the mid-infrared in a nonlinear crystal.

SUMMARY

The present disclosure describes examples of systems and methods for stabilizing mid-infrared light generated by difference frequency mixing.

In an example embodiment of an optical source, a mode locked Er fiber laser generates pulses. In this example an output beam of the Er fiber laser is split and directed into a fundamental arm and a wavelength shifting arm, also referred to as a pump arm and a signal arm, respectively. Pulses from the Er fiber laser are split, with a portion propagating in the fundamental or pump arm and a portion propagating in the wavelength shifting or signal arm. The pulses that propagate in the fundamental or pump arm are amplified to high powers in an optical power amplifier with Er doped fiber. The wavelength shifting arm also has a power amplifier with Er doped fiber to amplify the pulses propagating in the shifting arm. The wavelength shifting arm also can be configured to shift the pulses to longer wavelengths in, for example, a Raman-shifting fiber, where they can be further amplified by Tm doped fiber, and then further shifted by more Raman-shifting fiber if desired. Pulses from the two arms are combined in a nonlinear crystal such as orientation-patterned gallium phosphide (OP-GaP), producing the desired mid-infrared difference frequency, as well as other nonlinear combinations such as sum frequency combinations having near infrared and visible wavelengths. In some systems, stabilization can be achieved using two wavelength ranges with spectral filtering and multiple detectors acquiring information for feedback control. Beam intensity in a component of the system (e.g., signal arm or pump arm) can be controlled by controlling bending of a fiber carrying the light in that component and can be used to stabilize optical power.

In such an optical process, combining pulses from the two arms requires maintaining pulse overlap in space and time to improve the efficiency and stability of the mid-infrared generation. Since the pulses in the two arms can travel for meters before being combined, the relative timing between the two pulses being combined in the crystal can change significantly because of factors such as temperature or laser pump power drifts. To correct for these timing fluctuations, embodiments of the system can diagnose the timing difference by monitoring the intensity of, for example, one of the sum frequency pulses, and use this information in a feedback circuit that actively stabilizes the time delay by adjusting the travel time of one of the arms using a piezoelectric delay stage.

In some embodiments, stabilization of the optical output from the optical source can be achieved using two wavelength ranges with spectral filtering and multiple detectors acquiring information for feedback control. Beam intensity in a component of the system (e.g., a signal arm or a pump arm) can be controlled by controlling bending of a fiber carrying the light pulses in that component.

The foregoing summary and the following drawings and detailed description are intended to illustrate non-limiting examples but not to limit the scope of the disclosure

BRIEF DESCRIPTION OF THE DRAWINGS

FIG. 12A shows free running (with no active feedback to control noise) and stabilized results. FIG. 12B illustrates a control range which relates to the magnitude of noise reduction available with the example system.

The figures depict various embodiments of the present disclosure for purposes of illustration and are not intended to be limiting. Wherever practicable, similar or like reference numbers or reference labels may be used in the figures and may indicate similar or like functionality.

DETAILED DESCRIPTION

Overview

Figure 1:
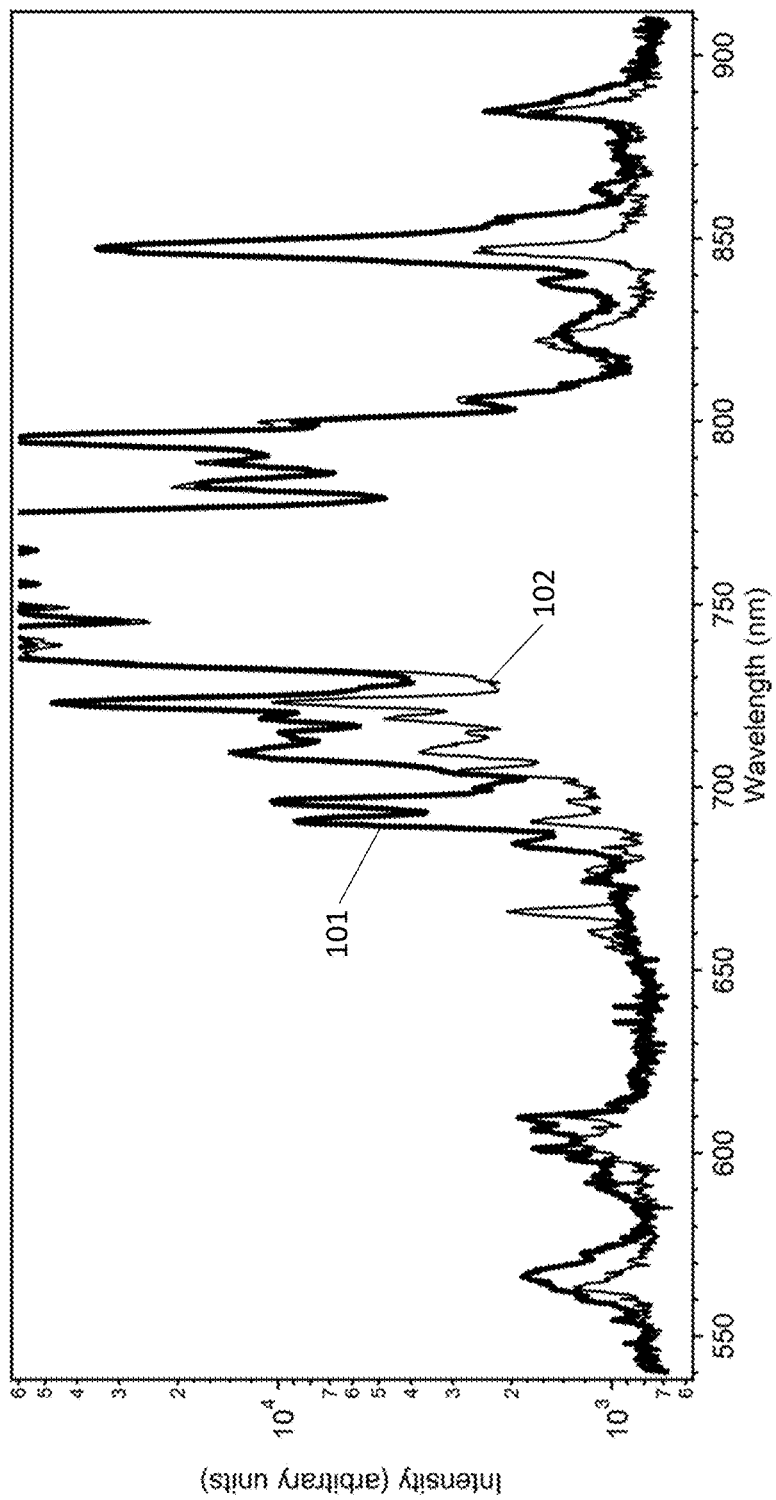
FIG. 1 shows example spectra of short wavelength light from an OP-GaP crystal pumped by light from an Er fiber laser. The lower curve is the spectrum when the relative time delay between pulses being combined in the crystal is large enough that there is little mid-infrared generated, and the upper, bold curve is the spectrum when there is good temporal overlap of pulses in the crystal, and strong mid-infrared generation.

To convert near infrared laser light to the mid-infrared, part of the laser output can be converted to longer wavelengths in appropriate fibers, and then mixed with the remaining original wavelength in a nonlinear crystal to generate light at the difference of the two frequencies in the mid-infrared spectral region (for example, U.S. Pat. No. 8,040,929 to Imeshev et al. and U.S. Pat. No. 8,861,555 to Fermann et al.). Near infrared light generally has a wavelength in a range from about 0.8 µm to about 2.5 µm, and mid-infrared light generally has a wavelength in a range from about 2.5 µm to about 25 µm. The use of wavelength shifting and amplification may require long fiber lengths which are sensitive to small temperature or pump laser power fluctuations, resulting in timing changes between the fundamental pulses and the shifted pulses being mixed (e.g., combined) at the nonlinear crystal. These temporal fluctuations can cause intensity fluctuations in the mid-infrared output, particularly at high powers. It is believed that such timing changes have not been previously addressed in fiber systems incorporating difference frequency generation (DFG), such as described in U.S. Pat. No. 8,811,435, Aug. 19, 2014, entitled: 'Laser device for production of a frequency comb free of CEO.'

To correct temporal fluctuations, a diagnostic measurement of the relative magnitude and direction of the timing error between the two interacting pulses can be used, particularly for fiber systems, as any changes in fiber temperature may produce large temporal variations in time delay. For optical parametric chirped pulse amplification systems based on solid-state lasers, Schwarz et al. and Fattahi et al., measured the timing error between two pulses by diverting significant laser power to implement a separate nonlinear optical measurement, which adds a significant amount of complexity and is not desirable.

Example Systems and Methods for Stable DFG

The present disclosure relates generally to the construction of mid-infrared optical sources using difference frequency generation (DFG) to convert near infrared laser light to the mid-infrared as well as other combinations such as sum frequency combinations having near infrared and visible wavelengths.

Fiber lasers are a robust and compact method for generating high brightness light. The three primary gain fiber types are ytterbium (Yb), erbium (Er), and thulium (Tm), which operate in the 1, 1.6, and 2 µm wavelength regions, respectively. Gain fibers with combinations of these elements, or other materials may also be used, for example, Nd, Ho, Er/Yb, Tm/Yb or Tm/Ho. By using short laser pulses and high average powers, new wavelengths can be generated by mixing in a nonlinear crystal. Embodiments using many types of lasers can be used, and the lasers are not limited to being fiber lasers. Examples of compatible pulsed sources include: modelocked fiber lasers, microresonators coupled to fibers, and continuous wave sources that are modulated by an optical modulator or by interference with one or more continuous wave sources.

Some nonlinear crystals such as orientation-patterned gallium phosphide (OP-GaP) are transparent in both the near infrared, and the mid-infrared, allowing nonlinear mixing to convert light from fiber lasers to the mid-infrared. Other embodiments using different nonlinear materials are possible, and can be appropriately chosen for different uses. Efficient nonlinear conversion relies on phase matching, which includes quasi-phase matching, of the different wavelengths involved. To improve phase matching and tunability, a device can control the phase matching, for example by rotating a birefringent crystal, or translating a crystal with different quasi-phase matching periods in different parts of the crystal, for example with different grating regions, or a fan-out-type gradient of grating periods. Control of the crystal positioning and angle may be performed automatically, or manually by the user.

Mid-infrared light can be generated by difference frequency mixing between a fundamental pump beam of pulses propagating from the pump arm, and a signal beam of pulses propagating from the signal arm. The signal beam of pulses can comprise for example a wavelength shifted version of the pulses in the pump beam, where the pump beam pulses are obtained from pulses from a modelocked laser, with amplification used as desired or necessary. When using soliton self-frequency shifting, the shifted pulse will be at longer wavelengths than the original pulse at the fundamental wavelength. If the modelocked laser is Yb based, it will lase near 1 µm, and the wavelength can be shifted up to about 1.6 µm wavelength where it can be amplified using appropriately pumped Er doped fiber. Alternatively, anti-Stokes frequency shifting of a modelocked Er fiber laser operating at 1.56 µm can be employed to generate an anti-Stokes output near 1 µm, which can then be amplified in an Yb doped fiber. Similarly, pulses from an Er system at 1.56 µm can be shifted up to about 2.0 µm, where they can be amplified by appropriately pumped Tm doped fiber. By adjusting laser parameters such as, e.g., pumping current, the wavelength of the pulses propagating in the signal arm can be controlled. In this way, it is possible to generate a pair of intense laser pulses whose tunable difference frequency is in the mid-infrared, about 6 to 11 µm wavelength range, in this example.

When nonlinearly combining two pulses in a non-linear medium, for example mixing collinear pulsed laser beams in a quasi-phase matched crystal one or more of the various possible nonlinear combinations of light may be optimized and selected as the output. For example, difference frequency generation (e.g.: down-conversion) can also be considered optical parametric amplification of the signal pulses.

In another example, sum frequency (e.g.: up-conversion) can be generated with appropriate phase matching conditions, such as the period in a quasi-phase matched crystal, or the angle of a birefringent crystal. Using example wavelengths of 1.56 μm and 2.0 μm, the sum frequency will be at 0.9 μm, which can be useful for applications such as nonlinear microscopy. Cascaded processes further increase the possible wavelength range of outputs, where frequency sums and differences can occur after each other in many possible sequences, for example, the addition of two pump frequencies, and the subtraction of one signal frequency.

The pulses can then be combined for mixing in the nonlinear crystal. While the pulses are traveling in their respective arms, they can undergo changes in respective travel times, such that they do not consistently overlap in time at the crystal. This can be due to, for example, temperature changes from either external sources or internal sources such as fluctuations in laser pumping power, or vibrations. This effect may be particularly pronounced in high power fiber systems, where long fiber lengths can multiply the effect of small temperature differences. For the pulses to overlap in time at the crystal, the time delay of at least one arm is adjusted. There are many methods to adjust a time delay, such as mounting one or more mirrors to a piezoelectric transducer or other movable stage, or stretching fibers with piezoelectric elements, and both fiberized and free space versions are possible.

Characteristics of the time delay control method include the speed at which the time delay can be controlled, and the range over which the time delay can be changed. Since faster methods usually have less range, better performance can be achieved, in some systems, by combining a fast method with a large range method. An example of a time delay control method is the mounting of a mirror on a piezoelectric transducer. Changes of the voltage to the piezoelectric transducer changes the time delay.

To stabilize the time delay, a diagnostic of the time delay can be used. Rather than build a separate optical system such as a balanced cross-correlator, which adds cost, complexity, and diverts output power, light, which is already being produced in the nonlinear crystal can be utilized as the diagnostic. While the system can be designed to produce strong mid-infrared output, there are several other frequency conversion processes taking place besides difference frequency generation, producing short wavelength light well into the visible region, in some cases. Accordingly, various embodiments of the optical sources described herein can provide mid-infrared output, near-infrared output, visible output, or combinations thereof. Example spectra are shown in FIG. 1, showing changes in the spectrum when there is (upper bold curve 101), or is not (lower curve 102), temporal overlap and difference frequency generation in an OP-GaP crystal pumped by an Er laser. A wavelength range can be separated by, for example, a transmission grating with apertures, or dielectric filters, then measured by a photodetector, providing a measurement that is related to the time delay between the pulses from the two arms. The mid-infrared output can be used, but by using short wavelength light as the diagnostic, the system may benefit from the lower cost and better noise properties of photodetectors for the visible and near infrared spectral regions compared to mid-infrared detectors.

Figure 2:
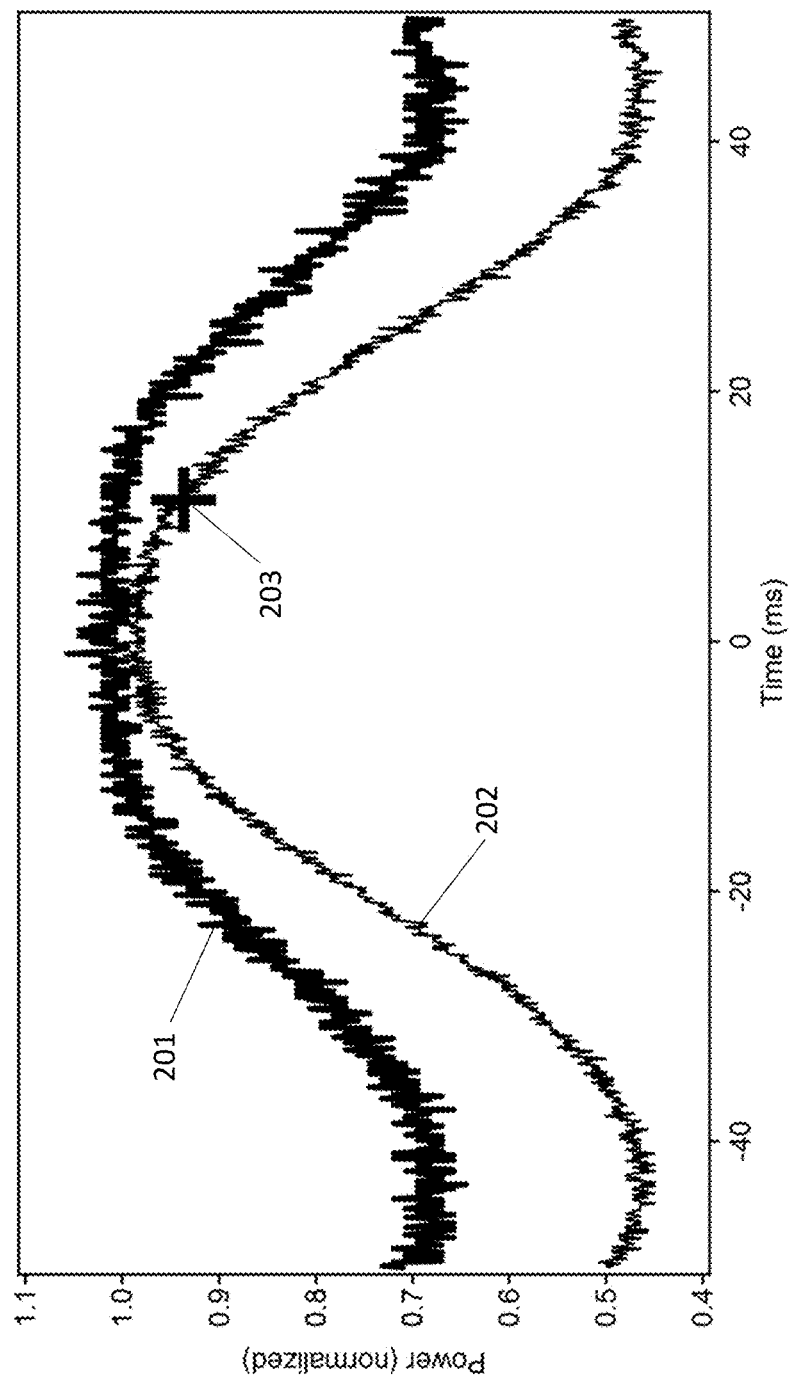
FIG. 2 shows an example of the power after the nonlinear crystal for light in a region around 850 nm (lower curve), and in the mid-infrared (upper curve), showing that they have different behavior with time delay, which is being modulated. The cross indicates an example target signal level that is suitable for side-of-fringe stabilization, while still providing nearly full mid-infrared output power.
Figure 3:
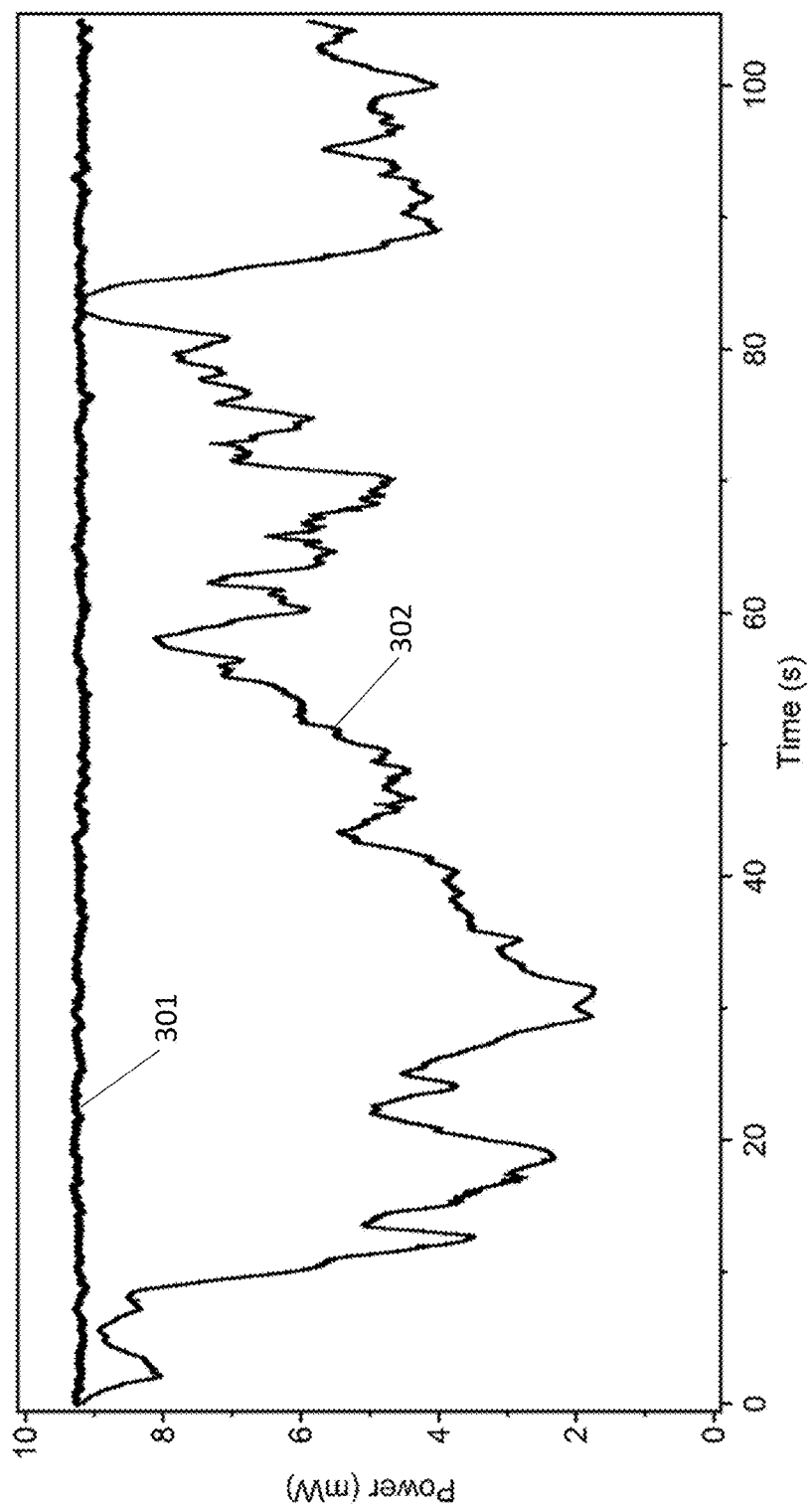
FIG. 3 shows an example of the mid-infrared power output for an OP-GaP crystal pumped by an Er fiber laser monitored over 100 s. The lower curve is the output when the system is free-running, with no active feedback to compensate changes in time delay. The upper curve is the output where the time delay is compensated by a piezoelectric stage while monitoring light from the crystal in a wavelength region around 850 nm.

FIG. 2 shows examples of changes in the power of light from an OP-GaP crystal pumped by an Er laser as the time delay between pump pulses and signal pulses is modulated by a piezoelectric stage for the mid-infrared (upper curve 201) and near-infrared light in a range of roughly 850 to 900 nm (lower curve 202). The mid-infrared DFG output varies with time delay, but changes less near the optimum delay than the near infrared power (e.g., the mid-infrared output curve 201 is flatter than the near infrared output curve 202 for times around 0 ms, e.g., about −10 ms to +10 ms). The near infrared wavelength range was chosen to optimize this behavior which is not required, but can be beneficial. Using this behavior, one way to diagnose the time delay is to use the near infrared power, by stabilizing at a time delay slightly away from the maximum output power, as indicated, e.g., by the cross 203 shown in FIG. 2. The range of the time delay that is slightly away from the maximum output power and can be used for stabilization can be, for example, time delays corresponding to times at about 1 ms to about 20 ms in FIG. 2 or more, or within the range over which the mid-infrared power output is relatively flat (e.g. within 1%, 5%, or 10% of the maximum power). With this flat behavior of the mid-infrared output, the output will still be nearly maximal, even if the time delay is slightly offset from 0 ms. In this case, for time delays in a small region around the target time delay, the photodetector signal will change approximately linearly with respect to the pulse time delay, making it an appropriate diagnostic for stabilizing the relative pulse delay. For example, this signal can be used as the error signal input for a proportional-integral or similar type of control circuit for feedback to the time delay actuator. Examples of stabilized (upper curve 301) and unstabilized (lower curve 302) mid-infrared output power are shown in FIG. 3 over a time period of 100 seconds. For the stabilized power curve 301, actuation was provided by a piezoelectric stage with a relatively large 0.12 mm range, and a response speed of about 10 Hz including the mirrors and mounts.

Figure 4:
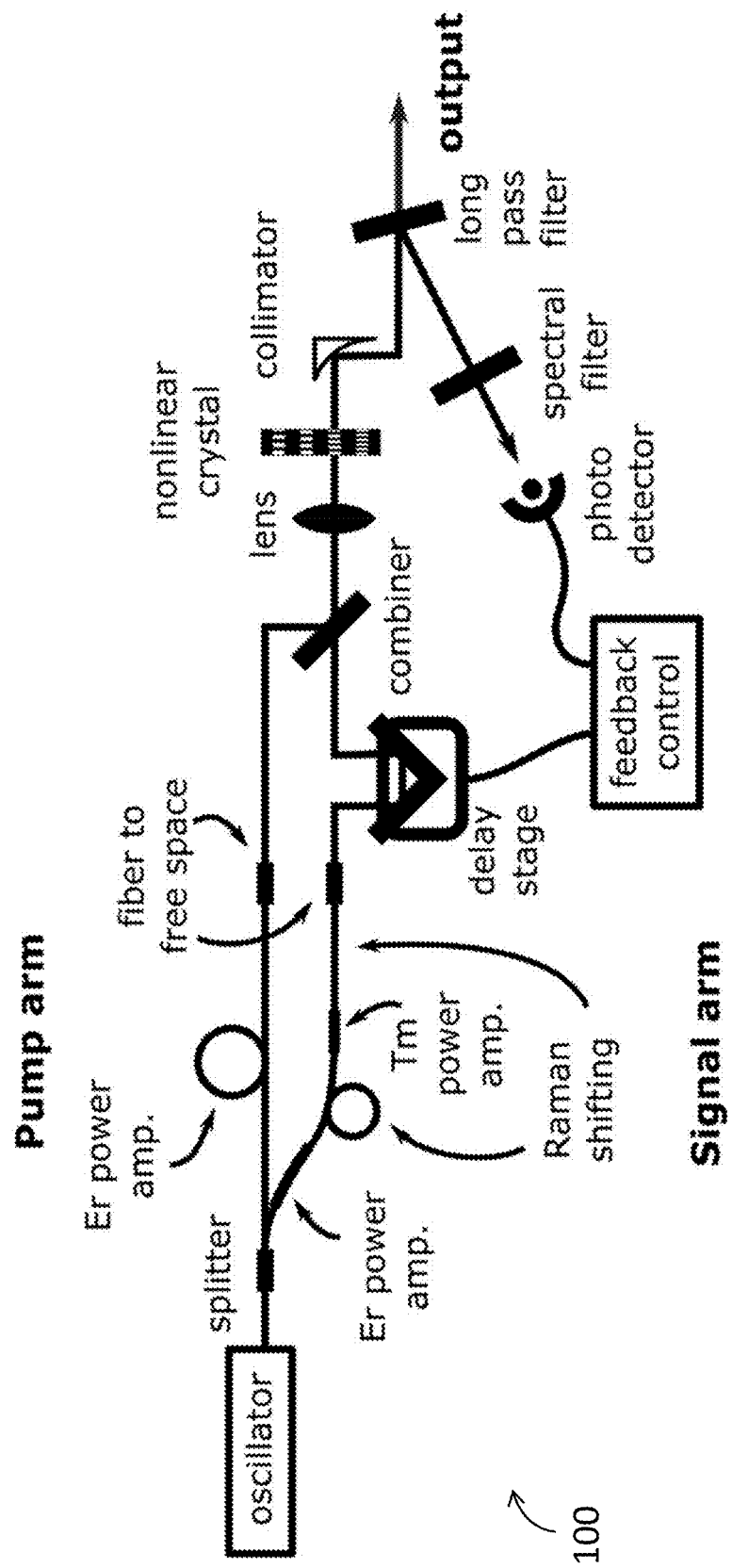
FIG. 4 schematically illustrates an embodiment of a difference frequency generation (DFG) optical source.

FIG. 4 shows a particular example of a DFG optical source 100. A mode-locked Er fiber oscillator generates laser pulses which are split into two arms, a pump arm and a signal arm. In at least one embodiment of the present disclosure, signal or pump light may propagate, in the form of optical pulses, and at least partially, in a length of optical fiber in the respective signal or pump arms. The pump arm pulses are strongly amplified by Er fiber. The pulses in the signal arm are first amplified by Er fiber, then shifted to longer wavelengths in a fiber (e.g., Raman-shifting fiber). The signal arm pulses are then further amplified by Tm fiber. Additional fiber (e.g., additional Raman-shifting fiber) can be used after Tm amplification if further wavelength shifting of the signal arm pulses is desired. Dispersion compensation such as fiber or Bragg gratings can be used throughout as needed to control pulse duration.

After length correction in free space, including a controllable time delay stage, the pump pulses and the signal pulses are combined on a combiner (e.g., a dichroic mirror). The two pulses being combined do not necessarily need to originate from the same original pulse prior to splitting into the two arms. The beams are focused in a nonlinear crystal by a lens. The nonlinear crystal may comprise OP-GaP. The relative pump and signal beam sizes are controlled by lens choice at the fiber outputs. Additional optics such as a telescope may also be used. Light after the crystal is collimated by a collimator, e.g., an off-axis parabolic mirror. A long pass filter passes the desired mid-infrared output, while reflecting pump, signal, and other frequency combinations (which may be at visible or near-infrared wavelengths). A spectral filter (e.g., a transmission grating) separates the wavelengths for selection of a particular sum-frequency wavelength (e.g., by a photodetector) for feedback or diagnostics. Additional spectral filtering might include a high-reflectivity mirror for removing the powerful pump beam. The detected sum-frequency intensity is used with a feedback control such as a proportional-integral loop filter for stabilizing the relative pulse timing (e.g., by adjusting the delay stage).

The feedback control can use other feedback methods, for example, the dither-and-lock method, where the time delay is intentionally modulated by a small amount at a given frequency, which provides directionality information while locking to the maximum signal.

Pulse timing stabilization can be considered as an amplitude stabilization method, rather than a frequency stabilization method, such as those using an optical beat frequency as the diagnostic. This may be preferred in applications where the laser intensity stability is more important than the frequency stability, such as laser material processing, or spectroscopic measurement of gases with broad absorption features. By stabilizing away from the maximum intensity, the control circuit has the freedom to compensate for both increases and decreases in intensity, whether or not they originate from changes in the time delay.

Figure 12A:
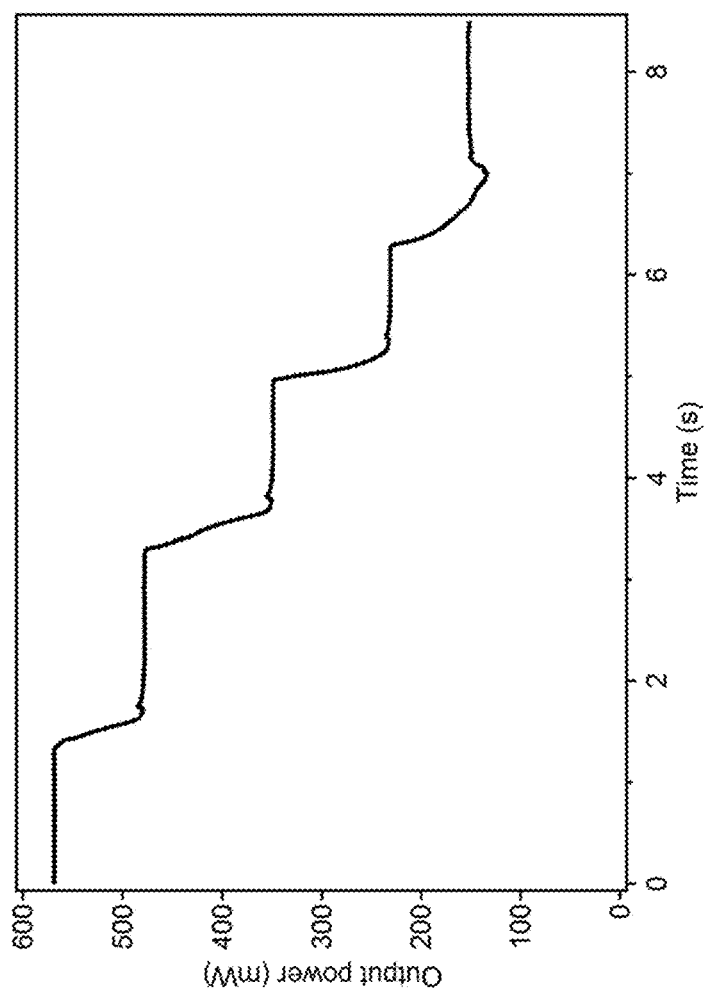
FIGS. 12A and 12B show examples of the performance of an embodiment of the noise eater, including a fiber-bend controller.
Figure 12B:
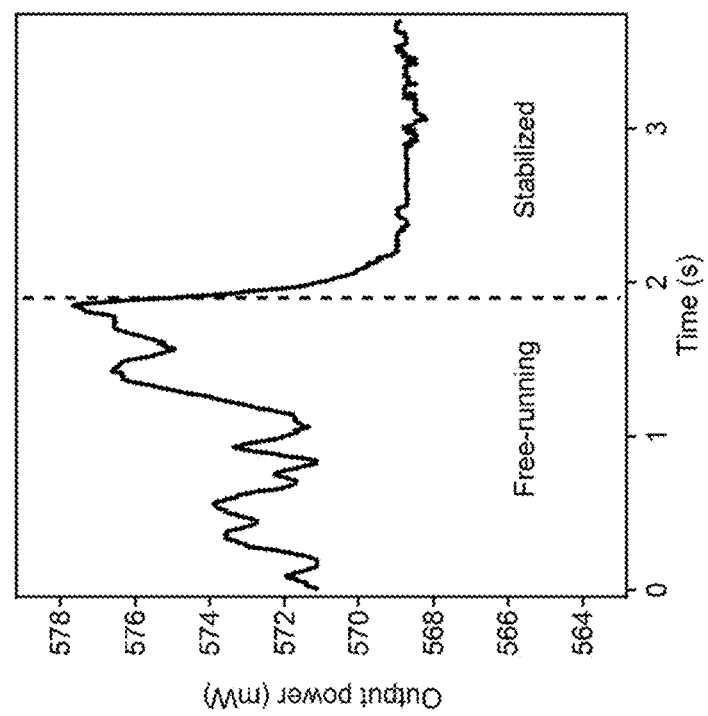

More generally than stabilization, the intensity can be controlled to have different values as a function of time, such as provided by a control signal (see, e.g., an example in FIG. 12B). For example, if the target signal level is modulated at a certain frequency (e.g., a constant frequency), the mid-infrared output will also be modulated at a certain frequency, which can be useful for an application such as lock-in detection.

The stabilization of the pulse timing can be useful when producing a mid-infrared frequency comb. The frequency comb from difference frequency generation has zero carrier envelope offset (CEO) frequency if the pump and signal combs have the same CEO. This means that it is not necessary to stabilize the CEO of the pump laser, as the difference will be zero as long as the pump and signal remain coherently related. This can be achieved by using, for example, coherent supercontinuum generation in highly nonlinear fiber to generate the signal wavelengths.

If desired, the CEO of the mid-infrared output can be controlled by adding an optical modulator to one of the pump or signal beams to shift the frequencies in one beam, which will also shift the frequencies in the difference frequency beam. Such a configuration was for example discussed in U.S. Pat. No. 9,036,971: 'Laser based frequency standards and their applications', to I. Hartl et al. This can be used to have a non-zero mid-infrared CEO frequency, or to actively control the mid-infrared CEO.

Figure 5:
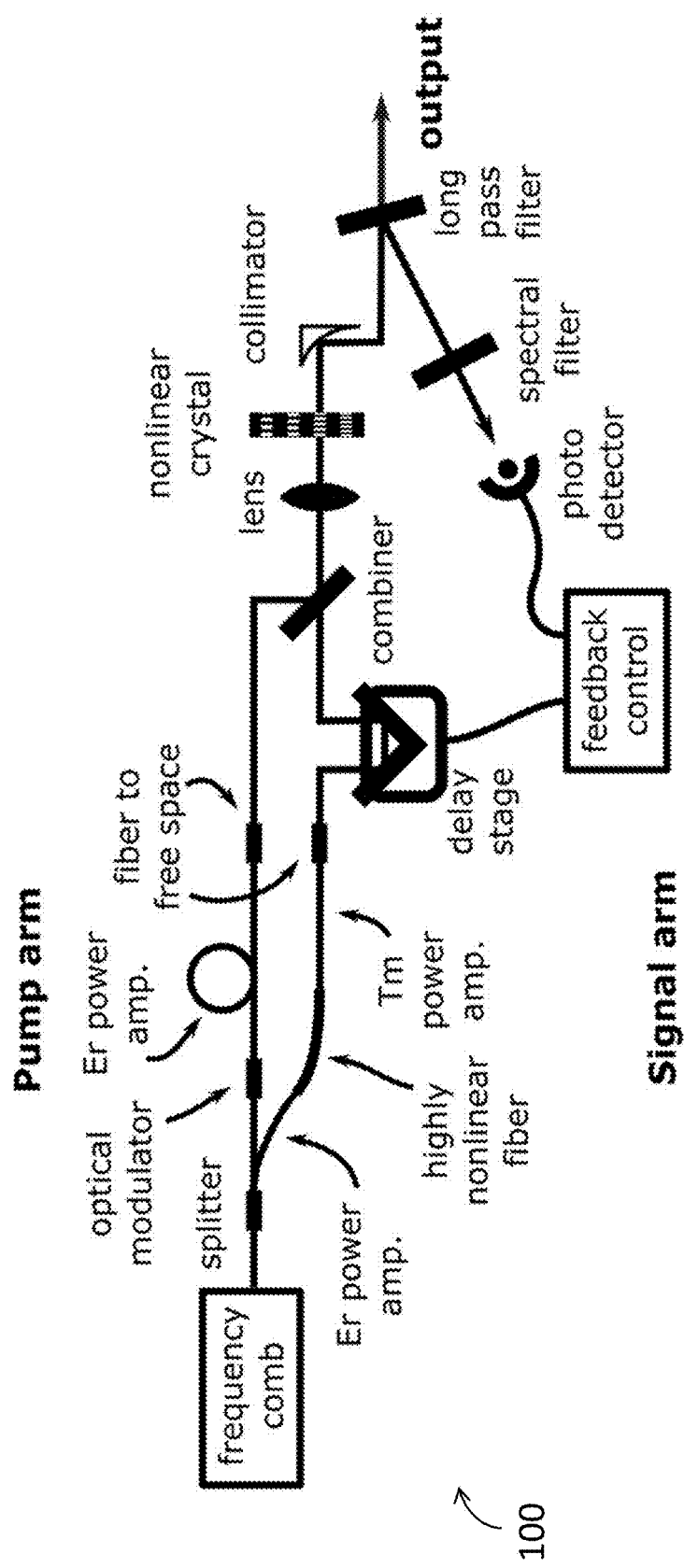
FIG. 5 schematically illustrates an embodiment of a difference frequency comb optical source.

An example of an optical source 100 including a frequency shifter to control CEO is shown in FIG. 5. This embodiment is similar to the optical source embodiment of FIG. 4, but with a frequency comb with controlled repetition rate instead of the oscillator, an optical modulator in the pump arm for controlling the CEO frequency of the mid-infrared output, and a different signal arm design. The signal arm has a supercontinuum generation stage using highly nonlinear fiber for generating additional wavelengths that have a high degree of coherence with the original laser pulses. Part of the supercontinuum is amplified in Tm fiber to serve as the signal pulse. In this case, the output will have a controllable CEO frequency.

While the example optical sources 100 described with reference to FIGS. 4 and 5 involve shifting the laser pulses to longer wavelengths, the pulses can also be shifted to shorter wavelengths, for example, in the case of supercontinuum. An example would be to have a Tm oscillator operating near 2 µm wavelength, with shifting to 1.6 µm for amplification with Er fiber. Another example is the common case where the supercontinuum generation results in higher spectral intensity at the high and low wavelength edges. Mixing these high and low components would provide very tunable pump and signal pulses for a large difference frequency tuning range.

Figure 6:
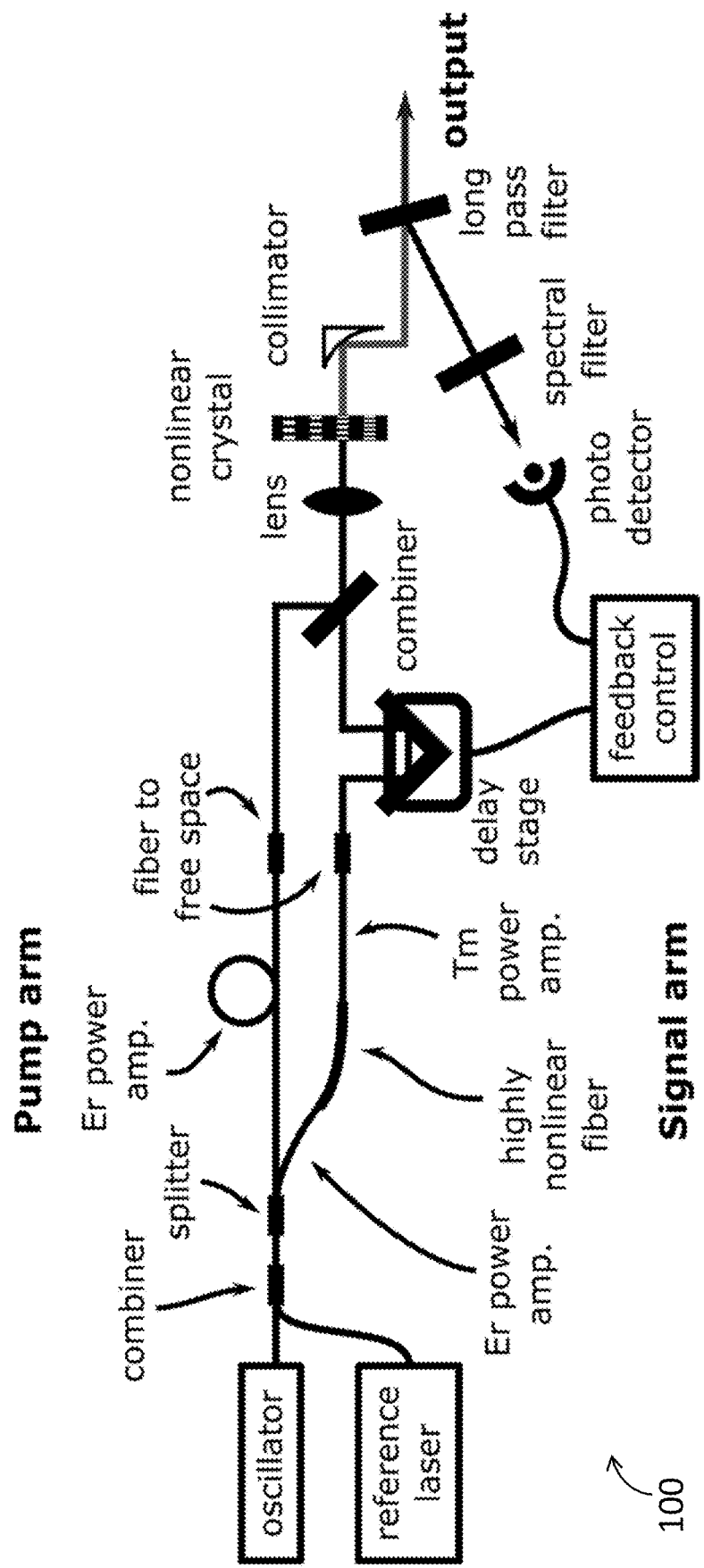
FIG. 6 schematically illustrates an embodiment of a DFG optical source.

Another diagnostic for measuring the difference between the two arms of the optical source 100 is to add reference light, for example from a stable continuous wave reference laser (e.g., at 1.3 µm wavelength), into the two arms, and then to measure their interference after travel through the fibers in the arms, providing an interferometric measurement of changes to the relative fiber lengths. In another example optical source 100, illustrated in FIG. 6, a reference beam from a reference laser is added after the oscillator, and before the beam is split into the pump and signal arms. The reference beam follows both the pump and signal beams through their fibers until the beam combiner. Interference between the combined reference beams is measured by a detector (e.g., the photodetector shown in FIG. 6), with the interference signal oscillating as the path length varies. The detected interference signal can be used as a diagnostic for side-of-fringe locking to a value roughly in the middle of the maximum and minimum intensity of the combined light, stabilizing the relative path lengths of the pump and signal arms. In another example embodiment, long pass filters near the end of the fibers reflect the reference beams, which return towards the reference source, but are diverted by an isolator for detection. This method does not require that the beam combiner for the pump and signal arms also combine the reference wavelength. To reduce or avoid side-of fringe locking, the reference laser can be frequency shifted with an additional modulator such as an acousto-optic modulator in either the pump or the signal arm, and the optical path length can then be stabilized by phase locking to the modulation frequency.

Embodiments of the mid-infrared optical sources 100 described herein (e.g., with reference to FIGS. 4-7 and 9-10) can be used to measure the spectra of materials of interest, including solids, liquids and gases. Frequency comb sources are particularly well suited to measuring the narrower spectral features of gases. Gases under test may be held in a simple gas cell, or for better sensitivity, in a multipass cell or an optical enhancement cavity.

Figure 7:
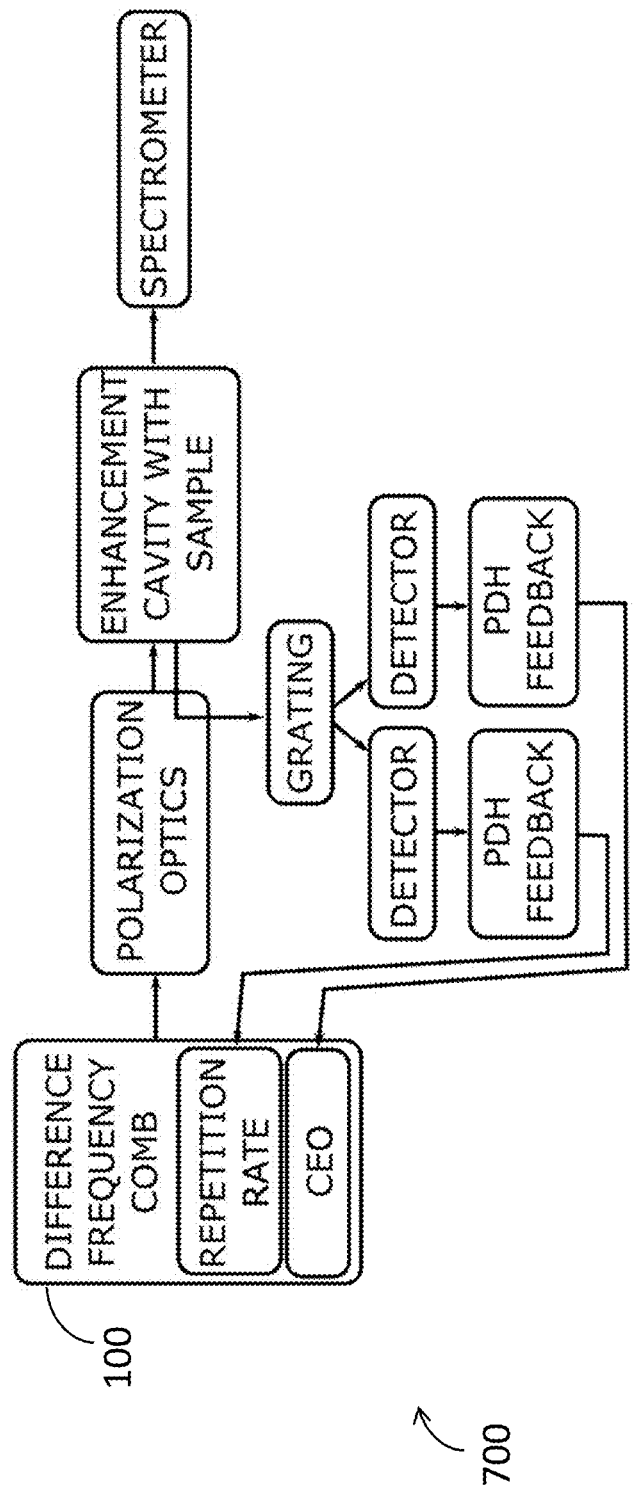
FIG. 7 is a block diagram that schematically illustrates an embodiment of a difference frequency comb spectroscopy system.

A frequency comb is well suited to coupling light into an optical enhancement cavity as the comb or cavity can be controlled to match the light and the resonant frequencies of the optical enhancement cavity. A block diagram schematically illustrating an example embodiment of a difference frequency comb spectroscopy system 700 is shown in FIG. 7. The spectroscopy system 700 comprises an optical source 100, such as a difference frequency comb source, which may permit repetition rate and CEO control (see, e.g., FIG. 5). Light from the source 100 may (optionally) pass through polarization optics before being coupled to an enhancement cavity that holds a material sample to be measured and then received by a spectrometer for spectral analysis. Some light from the enhancement cavity may (optionally) pass through the polarization optics to a grating and one or more photodetectors used for feedback to control the optical source 100 (e.g., the PDH feedback described below).

The stabilized difference frequency comb source can comprise an embodiment of the optical source 100, for example, an embodiment of the comb source described with reference to FIG. 5. Light from the comb source 100 can be coupled into an enhancement cavity using a two-point Pound-Drever-Hall (PDH) locking method (see, e.g., Foltynowicz 2013). The modulation used for the PDH lock can be from modulating the CEO of the difference frequency comb source 100 using the optical modulator in the pump arm. The two PDH feedback signals control the repetition rate and CEO of the difference frequency comb source 100 to maintain coupling between the comb and the optical enhancement cavity. The feedback signal to the optical modulator can be summed with the PDH modulation signal.

There are other cavity coupling methods, for example: single-point PDH locking, where only one detector provides a signal for generating a PDH feedback signal; and dither locking, where a parameter such as the laser repetition rate is periodically swept, resulting in bursts of light entering and subsequently leaving the enhancement cavity when the comb and cavity are resonant. Examples of spectrometers that can be used for spectral measurements include Fourier transform spectrometers, dispersive spectrometers including virtually-imaged-phased-array spectrometers, and streaking spectrometers.

For further improvement to stability, it is possible to detect additional signals for diagnosing the relative pulse timing for delay stabilization of the source 100. Ideally, there will be at least two different nonlinear combinations of input wavelengths with powers that peak at delays either before, or after the delay with peak DFG power. The nonlinear combinations of input wavelengths are sums or differences of available photons, and may include cascaded processes like the sum of pump and idler (e.g., the sum of the pump and the difference frequency). Examples of nonlinear combinations include frequency doubled, tripled, or higher harmonics, sum frequency generation, and combinations of these. The joining of about two or three photons will conveniently be at near-infrared and visible wavelengths for easy detection. Using the difference of these two signals, with possible adjustments to gain and offset, can yield an error signal that smoothly varies from negative to positive voltage across the optimum delay for DFG.

Figure 8:
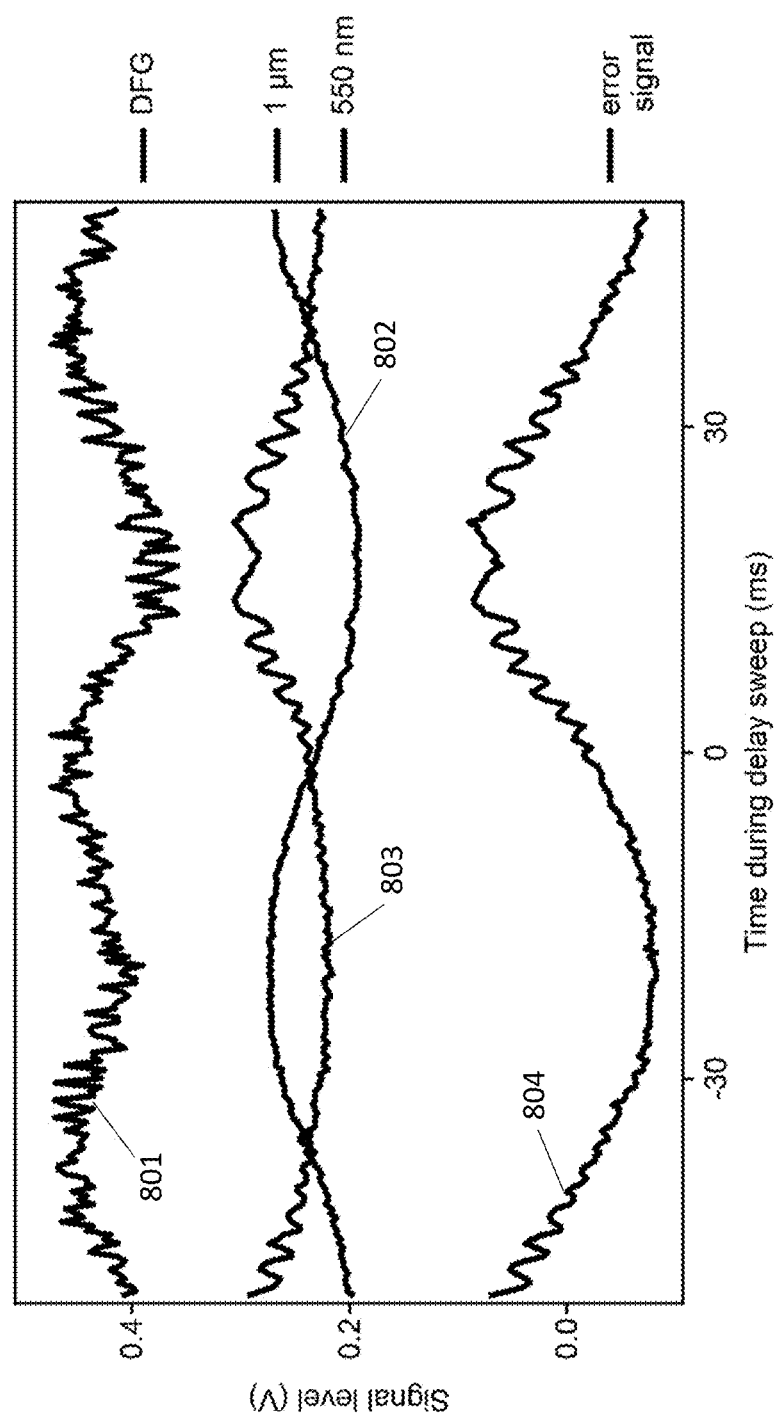
FIG. 8 illustrates oscilloscope traces representative of signal variations during oscillations of the time delay between the pump and signal pulses. The signals are the DFG output, a pair of visible (550 nm) and near-infrared (1 μm) nonlinear combinations which are used to generate an error signal (also shown) for indicating the magnitude and/or direction of the time delay offset.

An example of such signals are shown in an oscilloscope trace in FIG. 8 as the delay is oscillated, where nonlinear combinations around 1 μm (curve 802) and 550 nm (curve 803) wavelengths were found to oppositely increase or decrease in power when the time delay is changed around the particular delay corresponding to peak DFG output (curve 801), for example near 0 ms. An error signal (curve 804) can be generated from these two signals 802 and 803, and has a roughly linear slope across the delay with peak DFG (e.g., around 0 ms time during sweep).

Stabilization with two (or more) wavelength ranges can be more robust than using a single sum-frequency signal which may be locked close to the failure point, where the sign of the error signal changes, in order to increase DFG output. The two-nonlinear-combination signal can be locked at maximum DFG, meaning that there will be less change in DFG if the delay changes since the derivative of DFG power with delay is close to zero at this point. This method may also be more robust to changes in output power of one of the pump or signal arms depending on which nonlinear combinations are used.

Figure 9:
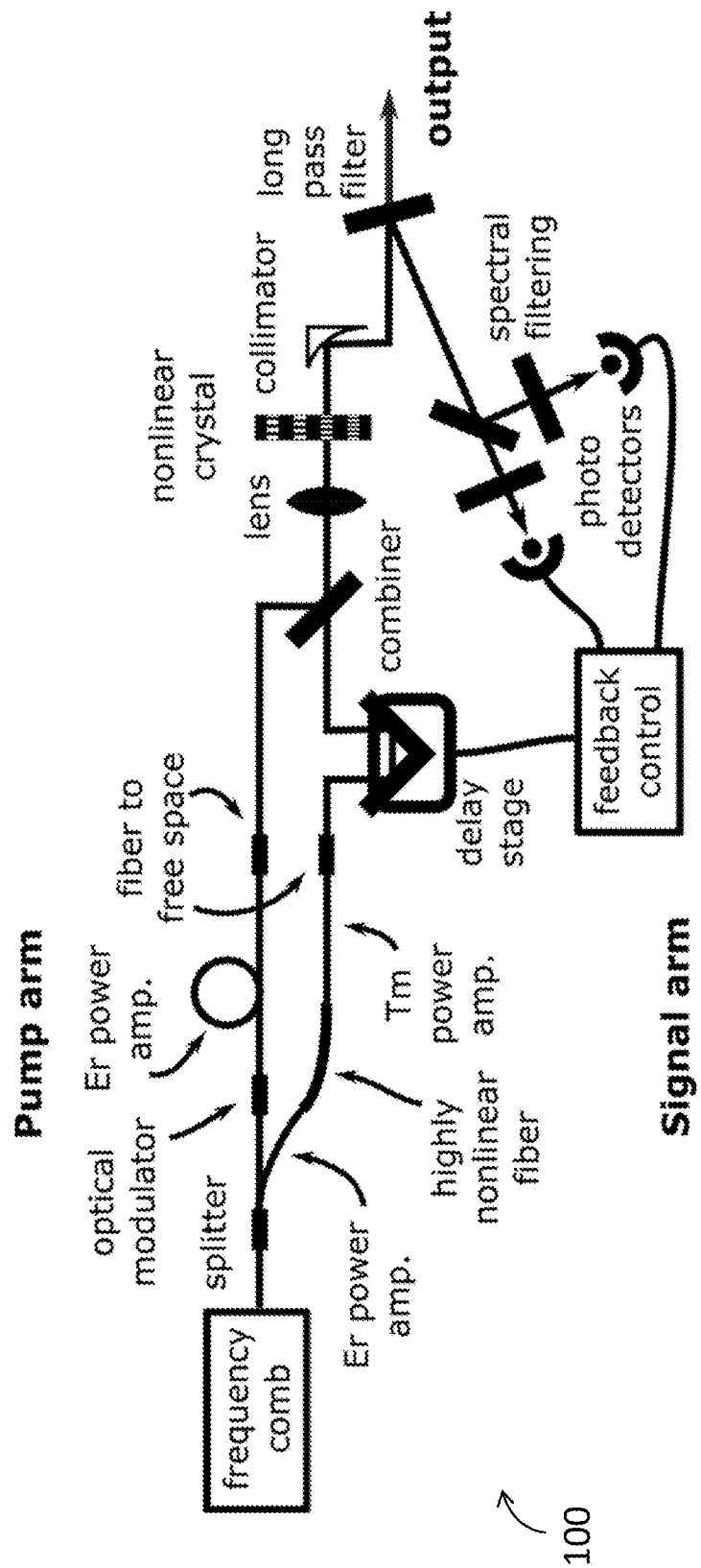
FIG. 9 schematically illustrates an example DFG optical source in which stabilization is achieved using two wavelength ranges with spectral filtering and multiple detectors acquiring information for feedback control.

A schematic of an example embodiment of an optical source 100 configured to use stabilization with two wavelength ranges is shown in FIG. 9. In this example, spectral filtering is used to separate the two desired wavelength ranges (of light received from the long pass filter) into two beams that are detected by two appropriate photodetectors. There are various possibilities for spectral filtering that can be implemented in embodiments of the optical source 100 shown in FIG. 9, such as, e.g., dichroic mirrors, bandpass filters, diffraction gratings, and their combinations. Both photodetector signals can contribute to the error signal used to control the time delay of the delay stage via the feedback control system.

Another method for further improving output stability of the optical source 100 is to actively stabilize one or both of the beams in the pump and signal arms. In some implementations the output is measured and used to adjust the current driving the laser(s). However, such an arrangement may be challenging to implement, for example, if the pump laser is a commercial system and there is no access to the current controls, or if the laser has nonlinear behavior, and current changes would lead to undesired changes in other parameters such as wavelength or pulse duration.

Figure 10:
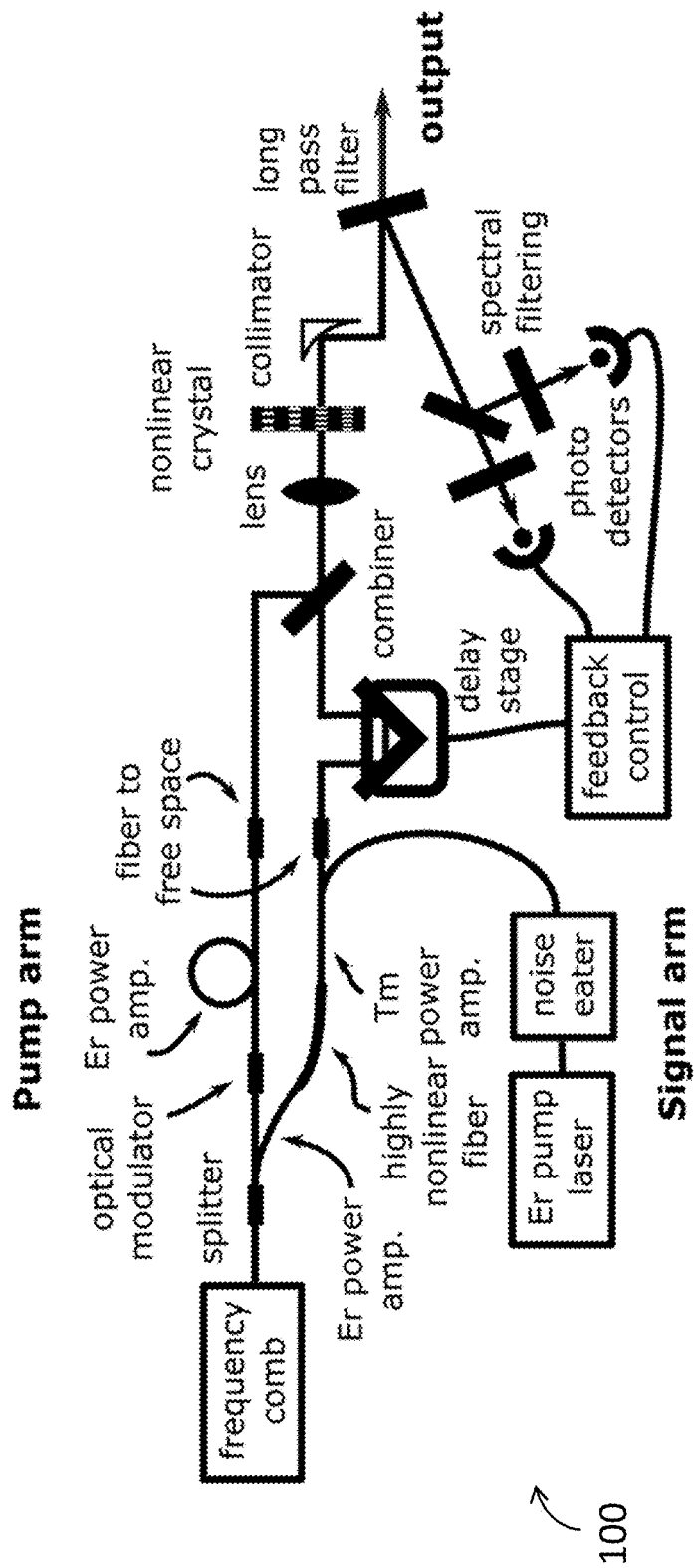
FIG. 10 schematically illustrates a DFG optical source according to FIG. 9 which further includes a noise reduction device (also referred to herein as a noise eater). In this example the noise eater is operatively connected to the output of an erbium fiber pump laser resulting in a noise reduced pump signal for a thulium power amplifier.

In at least one embodiment of the present disclosure, beam intensity is controlled by controlling the bending of the fiber carrying the light. Optical fiber is known to have more transmission loss the more it is bent. Therefore, by selectively bending the fiber, the amount of transmission loss from the bent fiber can be selectively controlled, hence the beam intensity leaving the fiber can be controlled. An example of a system comprising a noise reduction device (sometimes referred to as a noise eater) is shown in FIG. 10, where an Er pump laser for the Tm amplifier is configured with a delivery fiber that formed an input to the noise eater. The output of the noise eater, with noise reduction controlled by fiber bending that will be described below, pumped the Tm power amplifier. Noise in the DFG output from the embodiment of the optical source 100 shown in FIG. 10 (with the noise eater) was successfully reduced by about an order of magnitude compared to noise in the DFG output from the embodiment of the optical source 100 shown in FIG. 9 (without a noise eater).

Figure 11:
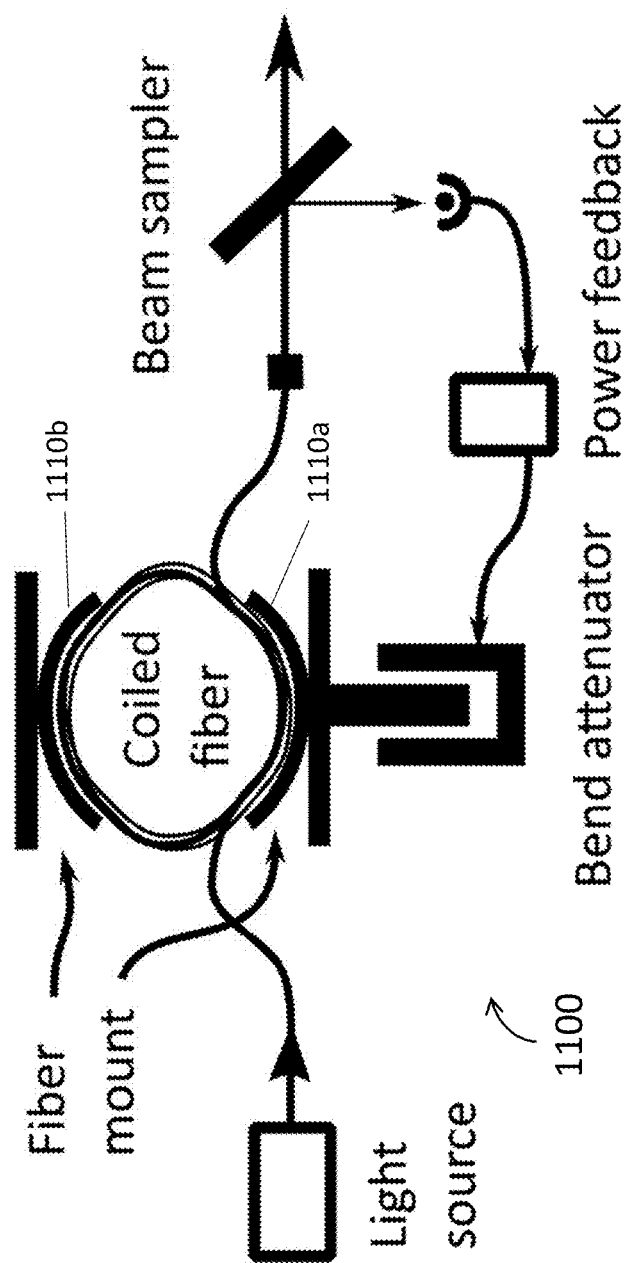
FIG. 11 schematically illustrates an example of a noise reduction device (noise eater) based on bending of optical fiber, including components for active control of fiber bending parameters.

A schematic of one example of a noise reduction device (noise eater) 1100 is shown in FIG. 11. In this example, the noise eater 1100 used controlled fiber bending to control the loss of light from a portion of bent (e.g., coiled) fiber. The noise eater 1100 includes a fiber coil mount, a bend attenuator, and a feedback system. The light, either already fiber coupled, or coupled into the fiber from free space, is coiled a few times in the mount, and then continues towards the output of the noise eater. The bend attenuator controls the bending loss of the coiled fiber by modifying the bending of the coiled fiber (e.g., by changing the bending radius of the coiled fiber). The physical motion that leads to bending of the coiled fiber may be provided by any number of actuators such as a linear motor, a voice coil, or a solenoid. A voice coil, as schematically illustrated in FIG. 11, has the advantage of directly translating a voltage into a position. In some embodiments a motor may be utilized, but may include additional electronics to track position, or to avoid excessive motion.

Another feature shown in FIG. 11 is the shape of the fiber coil mount, in which the coiled fiber is disposed between a lower support 1110a and an upper support 1110b. The shape of the supports 1110a or 1110b may be a portion of a circle. This fiber coil mount allows the fiber to be coiled with a relatively large diameter when the voice coil is in a low position and the upper and lower supports 1110a, 1110b are farther apart. In this configuration, there is relatively low loss of light (due to the larger fiber coil radius). When the voice coil moves to a higher position (so that the lower support 1110a moves closer to the upper support 1110b), the fiber primarily changes shape in the gap between the supports 1110a, 1110b, resulting in a smaller local bending radius at those positions. In this configuration, a larger possible loss can occur than if the supports 1110a, 1110b were not present, given a constant range of motion of the actuator. In this configuration, the smaller local bending radius causes increased loss of light and reduced output of light from the noise eater 1100. Accordingly (and as further described below), the example noise eater can controllably alter the light loss from the fiber, thereby controllably altering the beam intensity leaving the noise eater.

There are many possible ways to mount the fiber coil in the noise eater. A convenient method is to use adhesive to hold the fiber coil to the inside of a short metal tube (1 cm wide for example) with the desired resting diameter (6 cm diameter for example). In at least one implementation the metal is thin enough to bend with the actuator motion. The tube is then a convenient single piece for holding the fiber coil, serving as a heat sink for the fiber which may heat from the leaked light, and as containment for the leaked light. Disposing the fiber between two concentric rings, or opaque adhesive can also serve these purposes.

To function as a noise eater, a diagnostic of the output stability can be used. In FIG. 11, a beam sampler sends part of the output from the coiled fiber to a photodetector to provide a direct measurement of the output which is sent to a feedback circuit. The feedback circuit controls the bend attenuator (which controls the amount of bending of the coiled fiber), which controls the amount of light loss from the coiled fiber. This controller may be, for example, a proportional-integral (PI) type circuit. Software implementations may be useful, for example if the actuator includes a motor and the position is tracked, or if the target output power was more complicated than a single value, such as an arbitrary waveform. Many different diagnostics are also possible. For example, an autocorrelator can be used to measure the output of a pulsed laser, and a bend attenuator can be used on one of the laser components to maintain a desired pulse duration. The diagnostics can include measuring spectral characteristics such as the presence of light on the edges of the spectrum, or the spectral shape, which is an indicator of the state of nonlinear processes occurring in the system.

Examples of the performance of an optical source 100 comprising a fiber-bend noise eater 1100 is shown in FIGS. 12A and 12B. As discussed above with reference to FIG. 10, a coiled fiber bend attenuator controls the output of an erbium pump laser that is pumping a thulium power amplifier, the diagnostic is a sampled portion of the thulium amplifier output, and the plotted measurement is the output power of the thulium power amplifier. FIG. 12A shows a result comparing free running operation (without operation of the noise eater) with the stabilized output using the noise eater. The standard deviation of the power decreases by an order of magnitude from 0.31% to 0.029% after the noise eater is activated. Operation of the noise eater is further illustrated in FIG. 12B which shows, among other things, the control range of the fiber-bend based noise reduction device 1100, which can reduce output to about 25% in this example, where the target setting of the stabilization system was changed to 5 different values (the plateaus in FIG. 12B) over a period of about 8 s. The greater the dynamic range, the greater the magnitude of noise that can be reduced. For example, if the output shown in FIG. 12B is stabilized at 350 mW, the system will be able to correct for increases or decreases in the input of about 200 mW as long as it is within the response time of the system, which is discussed below. In cases where the input light is known to change in a certain direction, for example the power always increases if the room temperature changes, then the attenuator can be stabilized to a higher output power, and should be able to attenuate unwanted increases in the input power up to about four times. The dynamic range can be engineered by, for example, the number of loops in the fiber coil, the way the fibers are bent, or the maximum degree of bending used.

Although demonstrated for noise reduction in the DFG optical source 100 described with reference to FIG. 10, bending attenuation is a broadly applicable, nearly universal, control method and applicable for any light in an optical fiber, as the light does not need to pass through any additional medium besides the fiber it is already in. Thus, embodiments of the noise reduction device 1100 can be used with any of the embodiments of the optical source 100 described herein. Noise reduction can be particularly advantageous for short pulses, for example femtosecond pulses having bandwidths of about 20 nm or greater, which require careful dispersion management. It also means that embodiments of the noise eater 1100 can handle as much power as is in the fiber, while damage is an issue for powers of 1 W and greater with devices that require light to exit the fiber. For example, the system producing the results in FIGS. 12A and 12B was controlling 3 W of optical power. Bending attenuation does have wavelength dependence, with longer wavelengths more likely to leak out of the fiber, but this is generally a smooth function of wavelength, and will mostly be an issue only for very broad spectra approaching an octave or more. Bending attenuation is also a function of mode, so multimode fibers will be more challenging than single-mode fibers. Loss from multimode fibers can still be controlled, but the loss may generally reduce higher order modes more strongly than lower order modes, which may be advantageous in certain applications. When combined with a device which separates modes, the combined device would also have switching properties.

The speed of the bend attenuator in the noise eater 1100 may be limited by the mechanical speed of the bending. In the example noise reduction device used to stabilize the output shown in FIGS. 12A and 12B, which was not designed for high speed, the cutoff frequency was measured to be about 100 Hz (e.g., the range of power control at frequencies above the cutoff frequency is greatly reduced compared to the range of power control at frequencies below the cutoff frequency). With optimization for speed, such as mass reduction, a voice coil noise reduction device could operate on the order of kilohertz speeds. For further speed increases, a faster actuator such as a piezoelectric transducer used to compress or bend a smaller amount of fiber could provide speeds on the order of 100 kHz, but generally with a relatively small range of output powers that can be stabilized. By combining the slower and larger range voice coil with the faster and lower range piezoelectric transducer, the two noise reduction devices in combination could have high speed (e.g., up to about 100 kHz) and large range (e.g., up to about at least a few Watts, e.g., 3 Watts).

Several examples of DFG optical sources 100 have been discussed herein. However, it is to be understood that in additional or alternative implementations other methods are applicable when considering other frequency ranges to be the output. Two examples noted above are optical parametric amplification, and sum frequency generation. The optical parametric amplification case is generally similar to the difference frequency case, but with selection of the wavelength range of the signal beam as the output. The sum frequency generation arrangement is generally similar to that of DFG, except for appropriate choice of phase matching in the nonlinear crystal to favor sum frequency generation. Furthermore, different wavelengths may need to be selected for stabilizing the relative pulse timing of the two pulses being combined.

Additional Aspects and Examples

In a first aspect, an optical source comprises a pulsed laser configured to produce signal light in a signal arm and pump light in a pump arm, said pump arm and said signal arm each disposed downstream from said pulsed laser, said signal light comprising optical pulses having a signal frequency and said pump light comprising optical pulses having a pump frequency; a nonlinear crystal configured to receive said pump light and said signal light and to produce frequency converted light at one or both of a difference frequency or a sum frequency of said pump frequency and said signal frequency; a photodetector that detects light that is related to a relative time delay between optical pulses from said pump arm and optical pulses from said signal arm; a time delay control device configured to control said relative time delay; and a feedback circuit configured to use information from said photodetector to control said time delay control device to improve stability of said frequency converted light produced in said nonlinear crystal.

In a second aspect, the optical source of aspect 1, wherein at least one of said signal arm or said pump arm comprises a length of optical fiber.

In a third aspect, the optical source of aspect 1 or aspect 2, further comprising at least one frequency converter disposed between said pulsed laser and said nonlinear crystal, said at least one frequency converter configured to frequency shift said pump light or said signal light.

In a fourth aspect, the optical source of aspect 3, wherein said at least one frequency converter is disposed in said pump arm, in said signal arm, or in both said pump arm and said signal arm.

In a fifth aspect, the optical source according to aspect 3 or aspect 4, wherein said at least one frequency converter comprises a supercontinuum generator.

In a sixth aspect, the optical source according to aspect 5, wherein the supercontinuum generator comprises highly nonlinear fiber.

In a seventh aspect, the optical source according to aspect 5 or aspect 6, wherein said supercontinuum generator is disposed up-stream of a power amplifier.

In an eighth aspect, the optical source according to any one of aspects 3-7, where said at least one frequency converter is configured to produce longer wavelengths, shorter wavelengths, or both longer and shorter wavelengths.

In a ninth aspect, the optical source of any one of aspects 1-8, wherein the light that is related to the relative time delay between optical pulses from the pump and optical pulses from the signal arm is from said nonlinear crystal and comprises a nonlinear frequency combination of the pump light and the signal light.

In a 10th aspect, the optical source of any one of aspects 1-9, where the light that is related to the relative time delay between optical pulses from the pump arm and optical pulses from the signal arm is from a reference laser, at least a portion of which has traveled through part of the pump arm, and at least a portion of which has traveled through part of the signal arm.

In an 11th aspect, the optical source of any one of aspects 1-10, where the time delay control device comprises a piezoelectric transducers or an optical modulator.

In a 12th aspect, the optical source of any one of aspects 1-11, further comprising an optical modulator disposed in at least one of the signal arm or the pump arm.

In a 13th aspect, the optical source of aspect 12, wherein the optical modulator is configured as a control for the relative time delay of optical pulses from the pump arm and optical pulses from the signal arm.

In a 14th aspect, the optical source of any one of aspects 1-13, further comprising a spectrometer.

In a 15th aspect, the optical source of aspect 14, further comprising a multipass gas cell.

In a 16th aspect, the optical source of aspect 14, further comprising an optical enhancement cavity.

In a 17th aspect, the optical source of aspect 16, further comprising feedback electronics configured to maintain a match of optical output from the optical source to resonant wavelengths of the enhancement cavity.

In an 18th aspect, the optical source according to any one of aspects 1-17, further comprising at least one optical amplifier disposed down-stream from said pulsed laser.

In a 19th aspect, the optical source according to any one of aspects 1-18, wherein the pulsed laser comprises a Nd, Yb, Er, Tm, Ho, Er/Yb, Tm/Ho, or Tm/Yb fiber laser.

In a 20th aspect, the optical source according to any one of aspects 1-19, wherein said pulsed laser comprises one or a combination of a modelocked fiber laser, a microresonator, a pulsed source comprising a frequency comb, a pulsed source based on a modulated continuous wave (cw) laser, or beating of at least two cw lasers.

In a 21st aspect, the optical source according to any one of aspects 1-20, wherein said feedback circuit is configured to control light intensity according to a control signal.

In a 22nd aspect, the optical source according to aspect 21, wherein said control signal comprises a modulation of constant frequency.

In a 23rd aspect, the optical source according to aspect 22, wherein modulated output from the optical source is used for lock-in detection.

In a 24th aspect, the optical source according to any one of aspects 1-23, further comprising one or more additional photodetectors configured to detect at least two different nonlinear combinations of said pump light and said signal light to provide additional information to said feedback circuit.

In a 25th aspect, the optical source according to any one of aspects 1-24, wherein said nonlinear crystal is configured to produce light at the sum frequency of the pump light and the signal light.

In a 26th aspect, the optical source according to any one of aspects 1-25, wherein said nonlinear crystal is configured to amplify light at the signal frequency of the signal light.

In a 27th aspect, a light attenuator device, where light in an optical fiber is attenuated by actively controlled bending of said optical fiber to stabilize a measured output to a target value, where said target value may change in time.

In a 28th aspect, a light attenuator device, where light in an optical fiber is attenuated by a piezoelectric transducer which distorts a shape of said optical fiber to stabilize a measured output to a target value, where said target value may change in time.

In a 29th aspect, a light attenuator device, where light in an optical fiber is attenuated by a device according to aspect 27 and a device according to aspect 28.

In a 30th aspect, the light attenuator device according to any one of aspects 27-29, where said light comprises pulses with a spectral bandwidth of 20 nm or greater.

In a 31st aspect, the light attenuator device according to any one of aspects 27-30, where said light has an average power of 1 W or greater.

In a 32nd aspect, a fiber bender, where one or more loops of optical fiber are held in two curved fiber supports, and one or more of the two fiber supports are configured to be moved by an actuator to induce bending of the optical fibers in a region between the fiber supports.

In a 33rd aspect, the fiber bender of aspect 32, wherein at least one of the two curved fiber supports has a shape that is a portion of a circle.

In a 34th aspect, an optical source according to any one of aspects 1-26, wherein light in a component of said optical source is attenuated by a light attenuator device according to any one of aspects 27-31 or a fiber bender according to any one of aspects 32 or 33.

In a 36th aspect, an optical source according to any one of aspects 1-26, further comprising a noise reduction device configured to actively reduce noise in light propagating in the signal arm or the pump arm.

In a 37th aspect, an optical source according to aspect 36, wherein the noise reduction device is configured to actively control bending of an optical fiber to stabilize a measured output from the optical fiber to a target value. The target value can change in time.

Additional Considerations

The following patents, published patent applications, and non-patent publications are pertinent to the present disclosure:

Imeshev et al., U.S. Pat. No. 8,040,929
Fermann et al., U.S. Pat. No. 8,861,555
Schwarz et al., "Active stabilization for optically synchronized optical parametric chirped pulse amplification," OPTICS EXPRESS, Vol. 20, pp. 5557-5565 (2012).
Fattahi et al., "Pump-signal synchronization for MHz repetition rate, high-power optical parametric chirped pulse amplification," OPTICS EXPRESS, Vol. 20, pp. 9833-9840 (2012).
Foltynowicz et al., "Cavity-enhanced optical frequency comb spectroscopy in the mid-infrared application to trace detection of hydrogen peroxide," Appl. Phys. B, Vol. 110, pp. 163-175.
U.S. Pat. No. 8,811,435, Aug. 19, 2014, entitled: 'Laser device for production of a frequency comb free of CEO.'

Thus, the invention has been described in several embodiments. It is to be understood that the embodiments are not mutually exclusive, and elements described in connection with one embodiment may be combined with, rearranged, or eliminated from, other embodiments in suitable ways to accomplish desired design objectives. No single feature or group of features is necessary or required for each embodiment.

For purposes of summarizing the present invention, certain aspects, advantages and novel features of the present invention are described herein. It is to be understood, however, that not necessarily all such advantages may be achieved in accordance with any particular embodiment. Thus, the present invention may be embodied or carried out in a manner that achieves one or more advantages without necessarily achieving other advantages as may be taught or suggested herein.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" or "an" or "the" as used in this application and the appended claims are to be construed to mean "one or more" or "at least one" unless specified otherwise.

As used herein, the terms "comprises," "comprising," "includes," "including," "has," "having" or any other variation thereof, are open-ended terms and intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present.

Thus, while only certain embodiments have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. An optical source comprising:
a pulsed laser having a controlled repetition rate and configured to produce signal light in a signal arm and pump light in a pump arm, said pump arm and said signal arm each disposed downstream from said pulsed laser, said signal light comprising signal optical pulses having a signal frequency and said pump light comprising pump optical pulses having a pump frequency, said signal optical pulses and said pump optical pulses having pulse durations less than 1 ps, wherein at least one of said signal arm or said pump arm comprises a length of optical fiber;
a nonlinear crystal configured to receive said pump light and said signal light and to produce frequency converted light at both of a difference frequency and a sum frequency of said pump frequency and said signal frequency, said sum frequency light having an intensity related to a relative time delay between the pump optical pulses and the signal optical pulses;
a photodetector that detects said sum frequency light having the intensity related to said relative time delay;
a time delay control device configured to control said relative time delay; and
a feedback circuit configured to use information from said photodetector to control said time delay control device to improve stability of said frequency converted light produced in said nonlinear crystal.

2. The optical source of claim 1, further comprising at least one frequency converter disposed between said pulsed laser and said nonlinear crystal, said at least one frequency converter configured to frequency shift said pump light or said signal light.

3. The optical source of claim 2, wherein said at least one frequency converter is disposed in said pump arm, in said signal arm, or in both said pump arm and said signal arm.

4. The optical source according to claim 2, wherein said at least one frequency converter comprises a supercontinuum generator.

5. The optical source according to claim 4, wherein the supercontinuum generator comprises highly nonlinear fiber.

6. The optical source according to claim 4, wherein said supercontinuum generator is disposed up-stream of a power amplifier.

7. The optical source according to claim 2, where said at least one frequency converter is configured to produce longer wavelengths, shorter wavelengths, or both longer and shorter wavelengths.

8. The optical source of claim 1, where the time delay control device comprises a piezoelectric transducers or an optical modulator.

9. The optical source of claim 1, further comprising an optical modulator disposed in at least one of the signal arm or the pump arm.

10. The optical source of claim 9, wherein the optical modulator is configured as a control for the relative time delay of the pump optical pulses and the signal optical pulses.

11. The optical source of claim 1, further comprising a spectrometer.

12. The optical source of claim 11, further comprising a multipass gas cell.

13. The optical source of claim 11, further comprising an optical enhancement cavity.

14. The optical source of claim 13, further comprising feedback electronics configured to maintain a match of optical output from the optical source to resonant wavelengths of the enhancement cavity.

15. The optical source according to claim 1, further comprising at least one optical amplifier disposed downstream from said pulsed laser.

16. The optical source according to claim 1, wherein the pulsed laser comprises a Nd, Yb, Er, Tm, Ho, Er/Yb, Tm/Ho, or Tm/Yb fiber laser.

17. The optical source according to claim 1, wherein said pulsed laser comprises one or a combination of a mod-elocked fiber laser, a microresonator, a pulsed source comprising a frequency comb, a pulsed source based on a modulated continuous wave (cw) laser, or beating of at least two cw lasers.

18. The optical source according to claim 1, wherein said feedback circuit is configured to control light intensity according to a control signal.

19. The optical source according to claim 18, wherein said control signal comprises a modulation of constant frequency.

20. The optical source according to claim 19, wherein modulated output from the optical source is used for lock-in detection.

21. An optical source according to claim 1, wherein said nonlinear crystal is configured to amplify light at the signal frequency of the signal light.

22. An optical source comprising:
a pulsed laser configured to produce signal light in a signal arm and pump light in a pump arm, said pump arm and said signal arm each disposed downstream from said pulsed laser, said signal light comprising optical pulses having a signal frequency and said pump light comprising optical pulses having a pump frequency;
a nonlinear crystal configured to receive said pump light and said signal light and to produce frequency converted light at one or both of a difference frequency or a sum frequency of said pump frequency and said signal frequency;
a photodetector that detects light that is related to a relative time delay between optical pulses from said pump arm and optical pulses from said signal arm;
a time delay control device configured to control said relative time delay;
a feedback circuit configured to use information from said photodetector to control said time delay control device to improve stability of said frequency converted light produced in said nonlinear crystal; and
a noise reduction device configured to actively reduce noise in light propagating in the signal arm or the pump arm, wherein the noise reduction device is configured to actively control bending of an optical fiber to stabilize a measured output from the optical fiber to a target value.

23. An optical source according to claim 22, the noise reduction device comprising a piezoelectric transducer configured to distort a shape of the optical fiber to stabilize the measured output to the target value.

24. An optical source according to claim 22, where said measured output comprises light having pulses with a spectral bandwidth of 20 nm or greater.

25. An optical source according to claim 22, where said measured output comprises light having an average power of 1 W or greater.

26. An optical source according to claim 22, wherein the noise reduction device comprises a fiber bender comprising:
one or more loops of optical fiber that are held in at least two curved fiber supports, wherein one or more of the at least two fiber supports are configured to be moved by an actuator to induce bending of the one or more loops of optical fiber in a region between the at least two fiber supports.

27. An optical source according to claim 26, wherein one or more of the at least two curved fiber supports has a shape that comprises a portion of a circle.

\* \* \* \* \*